US012340615B2

(12) United States Patent
Huang et al.

(10) Patent No.: US 12,340,615 B2
(45) Date of Patent: Jun. 24, 2025

(54) METHOD OF TRACKING INPUT SIGN FOR EXTENDED REALITY AND SYSTEM USING THE SAME

(71) Applicant: HTC Corporation, Taoyuan (TW)

(72) Inventors: Ya-Bo Huang, Taoyuan (TW); ChienLiang Lin, Taoyuan (TW)

(73) Assignee: HTC Corporation, Taoyuan (TW)

( * ) Notice: Subject to any disclaimer, the term of this patent is extended or adjusted under 35 U.S.C. 154(b) by 397 days.

(21) Appl. No.: 17/849,696

(22) Filed: Jun. 26, 2022

(65) Prior Publication Data

US 2023/0177862 A1    Jun. 8, 2023

Related U.S. Application Data

(60) Provisional application No. 63/286,572, filed on Dec. 7, 2021.

(51) Int. Cl.
*G06V 40/10* (2022.01)
*G06F 3/0346* (2013.01)
*G06F 3/0488* (2022.01)
*G06V 10/25* (2022.01)
*G06V 10/80* (2022.01)
*G06V 20/20* (2022.01)
*G06V 20/64* (2022.01)

(52) U.S. Cl.
CPC ............ *G06V 40/11* (2022.01); *G06F 3/0346* (2013.01); *G06F 3/0488* (2013.01); *G06V 10/25* (2022.01); *G06V 10/803* (2022.01); *G06V 20/20* (2022.01); *G06V 20/64* (2022.01)

(58) Field of Classification Search
CPC .... G06F 3/017; G06F 3/04883; G06F 3/0346; G06V 40/11; G06V 10/25; G06V 20/20; G06V 10/803; G06V 20/64
See application file for complete search history.

(56) References Cited

U.S. PATENT DOCUMENTS

| 10,338,673 | B2 * | 7/2019 | Chen | G06V 40/10 |
| 10,671,842 | B2 * | 6/2020 | Chen | G06V 10/25 |
| 11,169,614 | B2 * | 11/2021 | Zhao | G06T 7/13 |
| 2021/0004619 | A1 * | 1/2021 | Qin | G06V 40/107 |
| 2022/0080060 | A1 * | 3/2022 | Jarvis | G16H 40/67 |

(Continued)

FOREIGN PATENT DOCUMENTS

| TW | M454051 | 5/2013 |
| TW | 201911133 | 3/2019 |
| WO | 2005120835 | 12/2005 |

OTHER PUBLICATIONS

"Office Action of Taiwan Counterpart Application", issued on Dec. 30, 2022, p. 1-p. 6.

*Primary Examiner* — Shefali D Goradia
(74) *Attorney, Agent, or Firm* — JCIPRNET

(57) ABSTRACT

A system and a method of tracking an input sign for an extended reality are provided, wherein the method including: obtaining an image; detecting for a handheld device and a hand in the image; in response to a first bounding box of the hand and a second bounding box of the handheld device being detected, detecting at least one joint of the hand from the image; performing a data fusion of the first bounding box and the second bounding box according to the at least one joint to obtain the input sign; and outputting a command corresponding to the input sign via the output device.

9 Claims, 5 Drawing Sheets

(56) References Cited

U.S. PATENT DOCUMENTS

| | | | |
|---|---|---|---|
| 2022/0198836 A1* | 6/2022 | Wu | G06V 40/107 |
| 2023/0154134 A1* | 5/2023 | Oh | G06V 20/20 |
| | | | 382/103 |

\* cited by examiner

METHOD OF TRACKING INPUT SIGN FOR EXTENDED REALITY AND SYSTEM USING THE SAME

CROSS-REFERENCE TO RELATED APPLICATION

This application claims the priority benefit of U.S. Provisional patent application Ser. No. 63/286,572, filed on Dec. 7, 2021. The entirety of the above-mentioned patent application is hereby incorporated by reference herein and made a part of this specification.

BACKGROUND

Technical Field

The disclosure relates to a method of tracking an input sign and a system using the same method, and particularly relates to a method of tracking an input sign for extended reality (XR) and a system using the same method.

Description of Related Art

Along with the improvement of technology, extended reality (e.g., augmented reality (AR), virtual reality (VR), or mixed reality (MR)) head mounted devices become more and more popular. To interact with the user, the head mounted device may create a virtual scene for the user and display a virtual object (e.g., virtual button) in the virtual scene. The user may operate the head mounted device by pressing or dragging the virtual object. However, the operating method mentioned above is not straightforward to the user and may exhaust the user.

SUMMARY

The disclosure is directed to a method of tracking an input sign for extended reality and a system using the same method.

The disclosure is directed to a system of tracking an input sign for extended reality, wherein the system including an output device, an image capture device, and a processor. The image capture device obtains an image. The processor coupled to the output device and the image capture device, wherein the processor is configured to: detect for a handheld device and a hand in the image; in response to a first bounding box of the hand and a second bounding box of the handheld device being detected, detect at least one joint of the hand from the image; perform a data fusion of the first bounding box and the second bounding box according to the at least one joint to obtain the input sign; and output a command corresponding to the input sign via the output device.

In one embodiment, the processor is further configured to: detect the at least one joint of the hand from the image in response to the first bounding box being overlapped with the second bounding box.

In one embodiment, the processor is further configured to: in response to a number of the at least one joint being greater than a threshold, perform the data fusion according to a first weight of the first bounding box; and in response to the number of the at least one joint being less than or equal to the threshold, perform the data fusion according to a second weight of the first bounding box, wherein the second weight is less than the first weight.

In one embodiment, the processor is further configured to: in response to the first bounding box not being detected, obtain the input sign according to the second bounding box; and in response to the second bounding box not being detected, obtain the input sign according to the first bounding box.

In one embodiment, the system further including the handheld device, wherein the handheld device including a touch screen.

In one embodiment, the processor is further configured to: detect the handheld device according to a positioning mark displayed by the touch screen.

In one embodiment, the handheld device is communicatively connected to the processor, and the processor is further configured to: receive a signal from the handheld device; and perform the data fusion of the first bounding box, the second bounding box, and the signal to obtain the input sign.

In one embodiment, the signal corresponds to a user input received by the touch screen of the handheld device.

In one embodiment, the handheld device further including an inertial measurement unit, wherein the signal corresponds to data generated by the inertial measurement unit.

In one embodiment, the output device includes a display, wherein the display outputs an extended reality scene according to the command.

In one embodiment, the output device includes a transceiver communicatively connected to the handheld device, wherein the process is further configured to: output the command to the handheld device via the transceiver.

The disclosure is directed to a method of tracking an input sign for extended reality, including: obtaining an image; detecting for a handheld device and a hand in the image; in response to a first bounding box of the hand and a second bounding box of the handheld device being detected, detecting at least one joint of the hand from the image; performing a data fusion of the first bounding box and the second bounding box according to the at least one joint to obtain the input sign; and outputting a command corresponding to the input sign via the output device.

Based on the above description, the disclosure recognizes an input sign for interacting with the extended reality by utilizing the relationship between the handheld device and the user's hand. Accordingly, the tracking accuracy for the input sign can be improved significantly.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
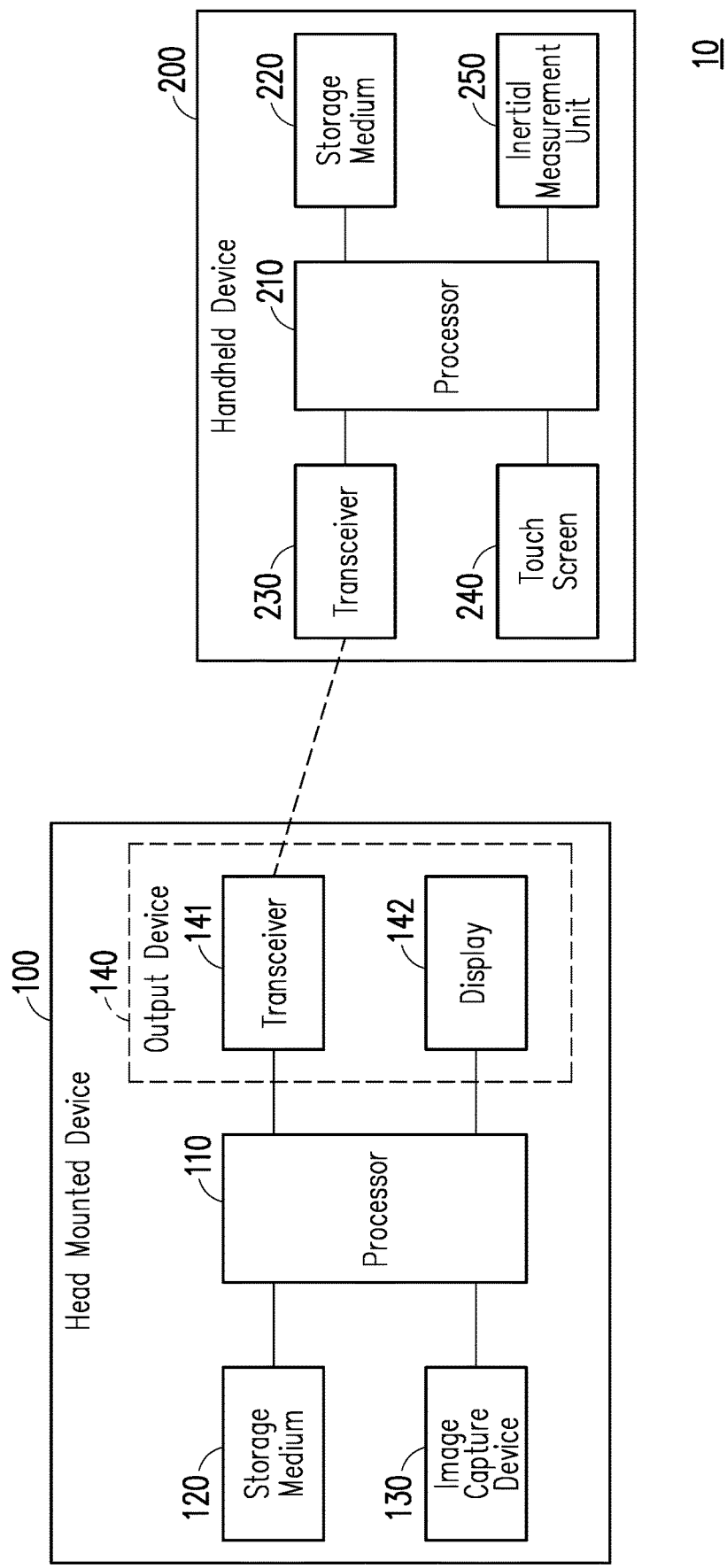
FIG. 1 illustrates a schematic diagram of a system of tracking an input sign for extended reality according to an embodiment of the present invention.

FIG. 1 illustrates a schematic diagram of a system 10 of tracking an input sign for extended reality according to an embodiment of the present invention, wherein the input sign may be used for interacting with a virtual scene created based on the extended reality technology. The system 10 may include a head mounted device 100. In one embodiment, the system 10 may further include a handheld device 200 which may communicatively connect to the head mounted device 100.

The head mounted device 100 may be worn by a user for exploring extended reality scenes. The head mounted device 100 may include a processor 110, a storage medium 120, an image capture device 130, and an output device 140.

The processor 110 is, for example, a Central Processing Unit (CPU), or other programmable general purpose or special purpose Micro Control Unit (MCU), a microprocessor, a Digital Signal Processor (DSP), a programmable controller, an Application Specific Integrated Circuit (ASIC), a Graphics Processing Unit (GPU), an Arithmetic Logic Unit (ALU), a Complex Programmable Logic Device (CPLD), a Field Programmable Gate Array (FPGA) or other similar device or a combination of the above devices. The processor 110 may be coupled to the storage medium 120, the image capture device 130, and the output device 140.

The storage medium 120 may be, for example, any type of fixed or removable random access memory (RAM), a read-only memory (ROM), a flash memory, a hard disk drive (HDD), a solid state drive (SSD) or similar element, or a combination thereof, configured to record a plurality of modules or various applications executable by the processor 110.

The image capture device 130 may be a camera or a photographic device for capturing images. The image capture device 130 may include an image sensor such as a complementary metal oxide semiconductor (CMOS) sensor or a charge coupled device (CCD) sensor.

The output device 140 may include but not limited to a transceiver 141 and a display 142. The transceiver 141 may configured to transmit or receive wired/wireless signals. The transceiver 141 may also perform operations such as low noise amplifying, impedance matching, frequency mixing, up or down frequency conversion, filtering, amplifying, and so forth. The head mounted device 100 may communicate with the handheld device 200 via the transceiver 141.

The display 142 may include but not limited to a liquid-crystal display (LCD) display or an organic light-emitting diode (OLED) display. The display 142 may provide an image beam to the eye of the user to form the image on the retinal of the user such that the user may see a virtual scene created by the head mounted device 100.

The handheld device 200 may include but not limited to a smartphone or a joystick. The handheld device 200 may include a processor 210, a storage medium 220, a transceiver 230, and a touch screen 240. In one embodiment, the handheld device 200 may further include an inertial measurement unit (IMU) 250.

The processor 210 is, for example, a CPU, or other programmable general purpose or special purpose MCU, a microprocessor, a DSP, a programmable controller, an ASIC, a GPU, an ALU, a CPLD, a FPGA or other similar device or a combination of the above devices. The processor 210 may be coupled to the storage medium 220, the transceiver 230, the touch screen 240, and the IMU 250.

The storage medium 220 may be, for example, any type of fixed or removable RAM, a ROM, a flash memory, a HDD, a SSD or similar element, or a combination thereof, configured to record a plurality of modules or various applications executable by the processor 210.

The transceiver 230 may configured to transmit or receive wired/wireless signals. The transceiver 230 may also perform operations such as low noise amplifying, impedance matching, frequency mixing, up or down frequency conversion, filtering, amplifying, and so forth. The handheld device 200 may communicate with the head mounted device 100 via the transceiver 230.

The touch screen 240 may include but not limited to a capacitive touch screen or a resistive touch screen. The IMU 250 may include but not limited to accelerometers, gyroscopes, or magnetometers.

Figure 2B:
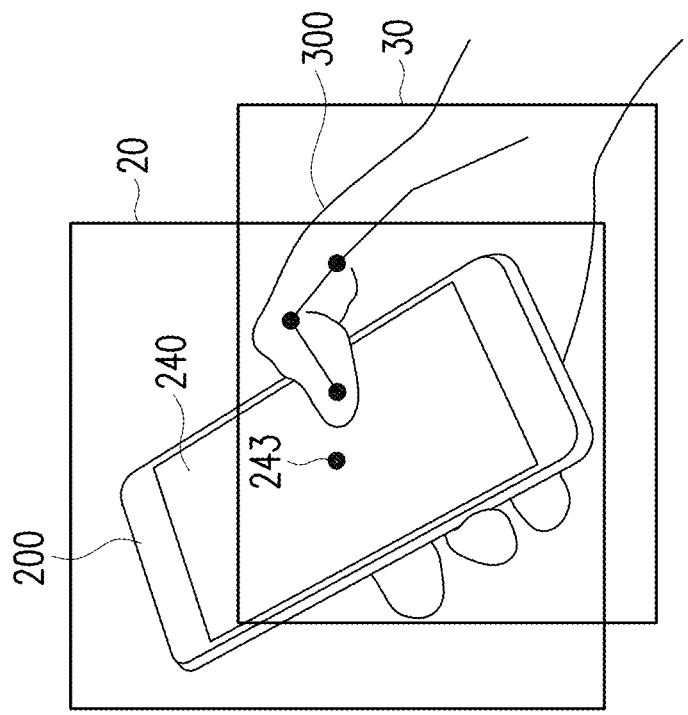
FIGS. 2A and 2B illustrate schematic diagrams of input signs presented by the handheld device and the user's hand according to an embodiment of the present invention.
Figure 2A:
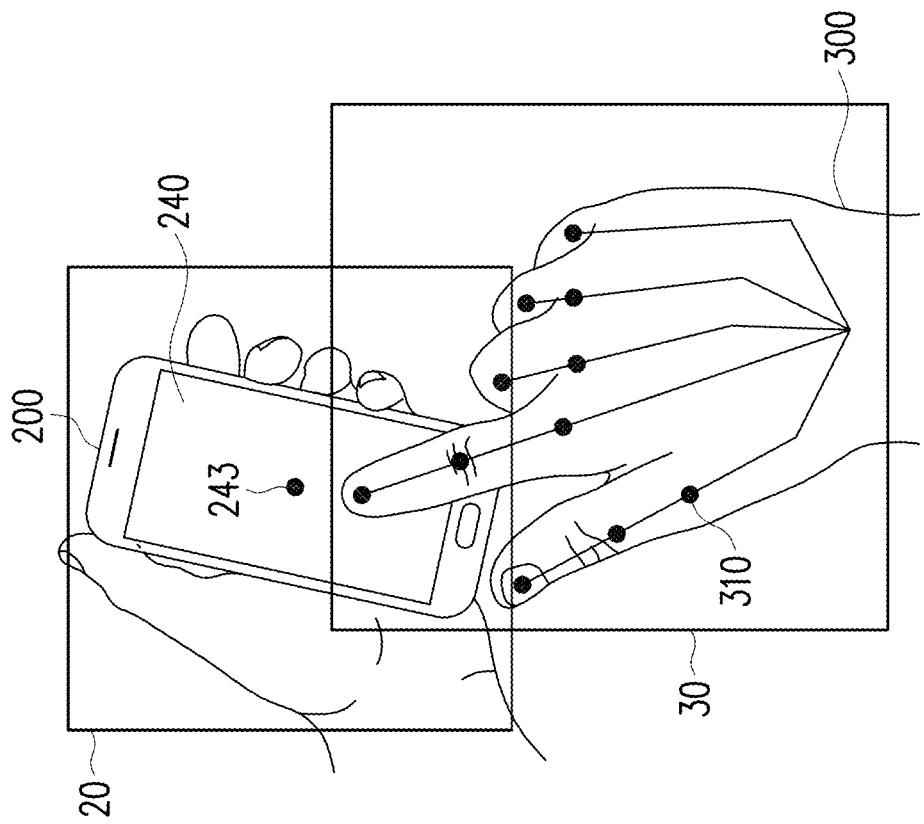

The image capture device 130 may obtain an image. The processors 110 may detect the obtained image to determine whether the handheld device 200 or the hand (e.g., hand 300 as shown in FIG. 2A or 2B) of the user are in the image. Specifically, the processor 110 may detect the image based on, for example, an object detection algorithm, so as to determine whether an object is in the image. If an object is in the image, the object detection algorithm may create a bounding box for the object. The processor 110 may perform an image recognition algorithm on the bounding box to recognize the object in the bounding box.

FIGS. 2A and 2B illustrate schematic diagrams of input signs presented by the handheld device 200 and the user's hand 300 according to an embodiment of the present invention. If the handheld device 200 or the hand 300 are in the image captured by the image capture device 130, the processor 110 may generate a bounding box 20 on the image for the handheld device 200 or generate a bounding box 30 on the image for the hand 300.

In one embodiment, a positioning mark 243 may displayed by the touch screen 240 of the handheld device 200. The processor 110 may position and detect the handheld device 200 and/or the hand 300 trying to operate the handheld device 200 according to the positioning mark 243.

In response to the bounding box 20 and the bounding box 30 being detected on the image, the processor 110 may detect one or more joints 310 of the hand 300 from the image. The processor 110 may detect the joints 310 based on a hand tracking algorithm.

In one embodiment, the processor 110 may detect the joints 310 of the hand 300 from the image if the bounding box 20 and the bounding box 30 are overlapped with each other. If the bounding box 20 and the bounding box 30 are overlapped with each other, the processor 110 may determine to obtain an input sign presented by the handheld device 200 and the hand 300. However, if the bounding box 20 and the bounding 30 are not overlapped with each other, the processor 110 may determine to obtain the input sign according to one of the bounding box 20 and the bounding box 30. That is, there may be only one of the handheld device 200 and the hand 300 will be used by the processor 110 to obtain the input sign. For example, if the bounding box 20 of the handheld device 200 is detected from the image but the bounding box 30 of the hand 300 is not detected from the image, the processor 110 may determine to obtain the input sign according to the handheld device 200 only. If the bounding box 30 of the hand 300 is detected from the image but the bounding box 20 of the handheld device 200 is not detected from the image, the processor 110 may determine to obtain the input sign according to the hand 300 only.

The processor 110 may perform a data fusion of the bounding box 20 and the bounding box 30 according to the detected joints 310 to obtain or recognize the input sign, wherein the input sign may be associated with a six degrees of freedom (6DOF) pose of the hand 300. The weight of the bounding box 20 or the weight of the bounding box 30 for performing the data fusion may be adjusted dynamically. In some cases, the weight of the bounding box 20 may be greater than the weight of the bounding box 30. That is, the result of the data fusion would be influenced by handheld device 200 more than by the hand 300. In some cases, the weight of the bounding box 30 may be greater than the weight of the bounding box 20. That is, the result of the data fusion would be influenced by the hand 300 more than by the handheld device 200.

In one embodiment, the processor 110 may perform the data fusion of the bounding box 20 and the bounding box 30 according to a first weight of the bounding box 30 in response to the number of the joints 310 being greater than a threshold (e.g., 3), and the processor 110 may perform the data fusion of the bounding box 20 and the bounding box 30 according to a second weight of the bounding box 30 in response to the number of the joints 310 being less than or equal to the threshold (e.g., 3), wherein the second weight is less than the first weight. In other words, if the number of joints 310 detected by the processor 110 is greater than the threshold, the weight of the bounding box 30 for performing the data fusion may be increased since the image clearly shows the hand 300. Accordingly, the weight of the bounding box 20 for performing the data fusion may be decreased. On the other hand, if the number of joints 310 detected by the processor 110 is less than or equal to the threshold, the weight of the bounding box 30 for performing the data fusion may be decreased since the most of the area of the hand 300 may be covered by the handheld device 200, as shown in FIG. 2B. Accordingly, the weight of the bounding box 20 for performing the data fusion may be increased.

In one embodiment, the processor 110 may receive a signal from the handheld device 200 via the transceiver 141. The processor 110 may perform the data fusion of the bounding box 20, the bounding box 30, and the signal to obtain or recognize the input sign.

Figure 3B:
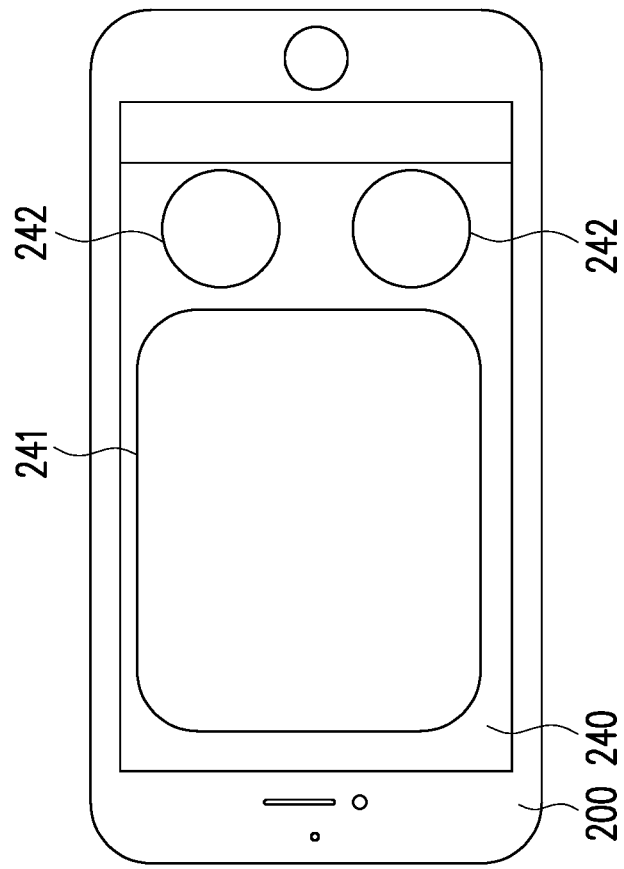
FIGS. 3A and 3B illustrate schematic diagrams of the touch screen of the handheld device according to an embodiment of the present invention.
Figure 3A:
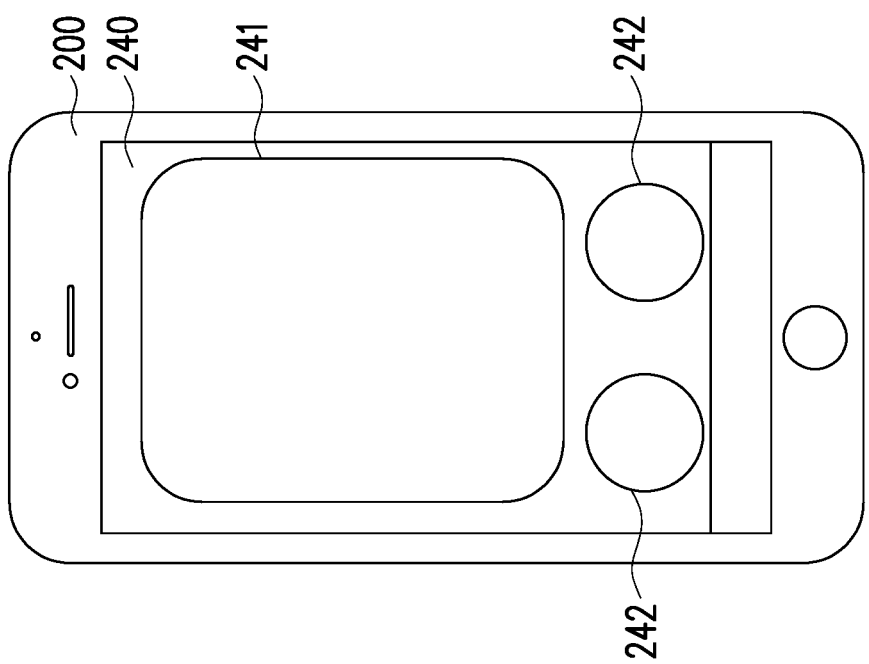

In one embodiment, the signal from the handheld device 200 may correspond to a user input received by the touch screen 240 of the handheld device 200. FIGS. 3A and 3B illustrate schematic diagrams of the touch screen 240 of the handheld device 200 according to an embodiment of the present invention. The touch screen 240 may provide a user interface for obtaining a user input, wherein the user interface may include a touch area 241 for receiving a drag operating or a slide operating or one or more buttons 242 for receiving a click operating. The user interface may be presented in a portrait mode as shown in FIG. 3A or may be presented in a landscape mode as shown in FIG. 3B.

In one embodiment, the signal from the handheld device 200 may corresponding to data generated by IMU 250. For example, the signal from the handheld device 200 may include acceleration information of the handheld device 200. Accordingly, the input sign obtained by the processor 110 may be influenced by the data generated by IMU 250.

After performing the data fusion of the bounding box 20 and the bounding box 30, the processor 110 may obtain or recognize the input sign according to the result of the data fusion. Accordingly, the processor 110 may operate the head mounted device 100 according to the input sign. The processor 110 may output a command corresponding to the input sign via the output device 140.

In one embodiment, the processor 110 may transmit a command corresponding to the input sign to the transceiver 141. The transceiver 141 may output the received command to an external electronic device such as the handheld device 200. That is, the head mounted device 100 may feedback information corresponding to the input sign to the handheld device 200.

Figure 4:
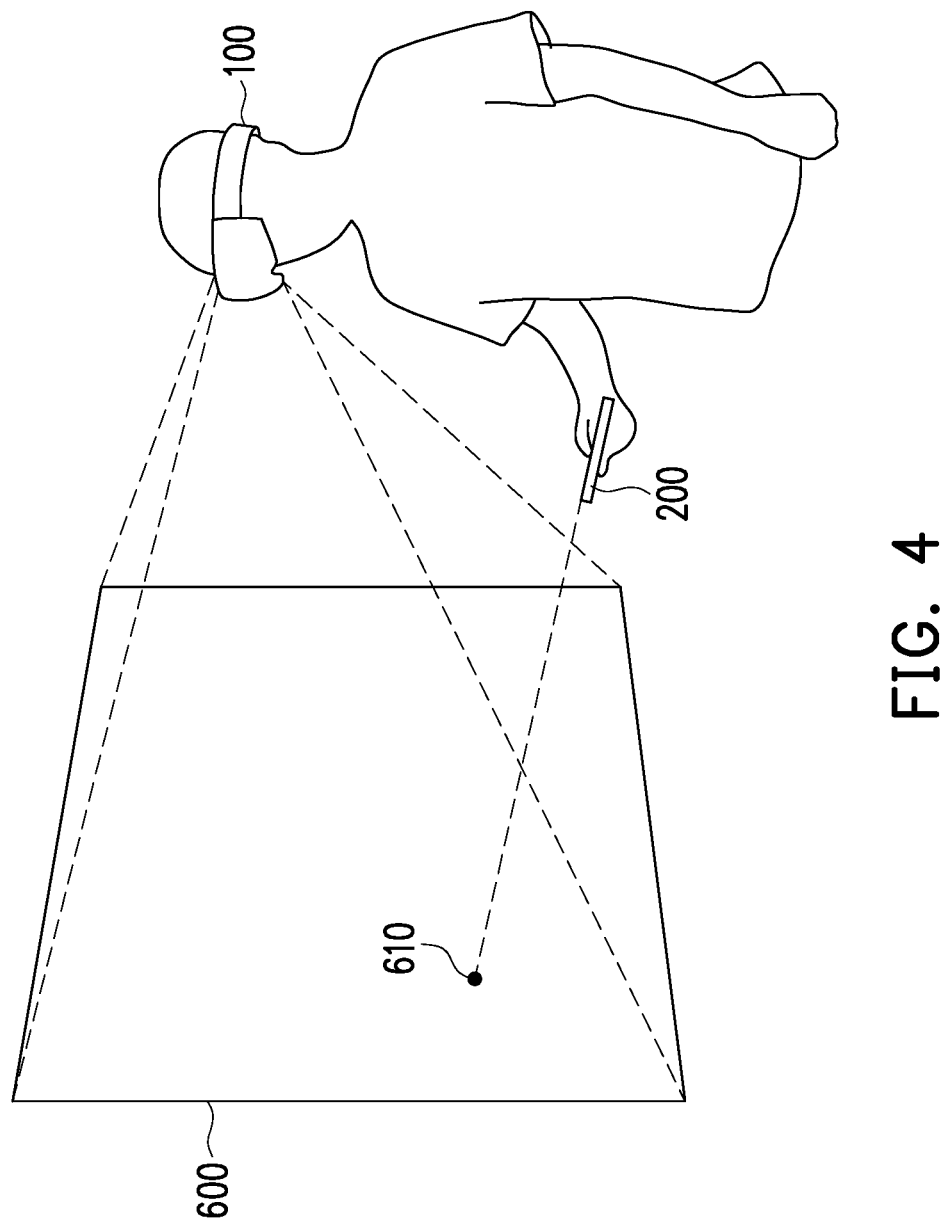
FIG. 4 illustrates a schematic diagram of interacting with the extended reality by using a handheld device with an inertial measurement unit according to an embodiment of the present invention.

In one embodiment, the processor 110 may transmit a command corresponding to the input sign to the display 142. The display 142 may output an extended reality scene according to the received command. For example, assuming that the input sign obtained by the processor 110 is associated with data generated by the IMU 250. The processor 110 may transmit a command corresponding to the input sign to the display 200, wherein the command may move a cursor 610 in the extended reality scene 600 displayed by the display 142, as shown in FIG. 4.

Figure 5:
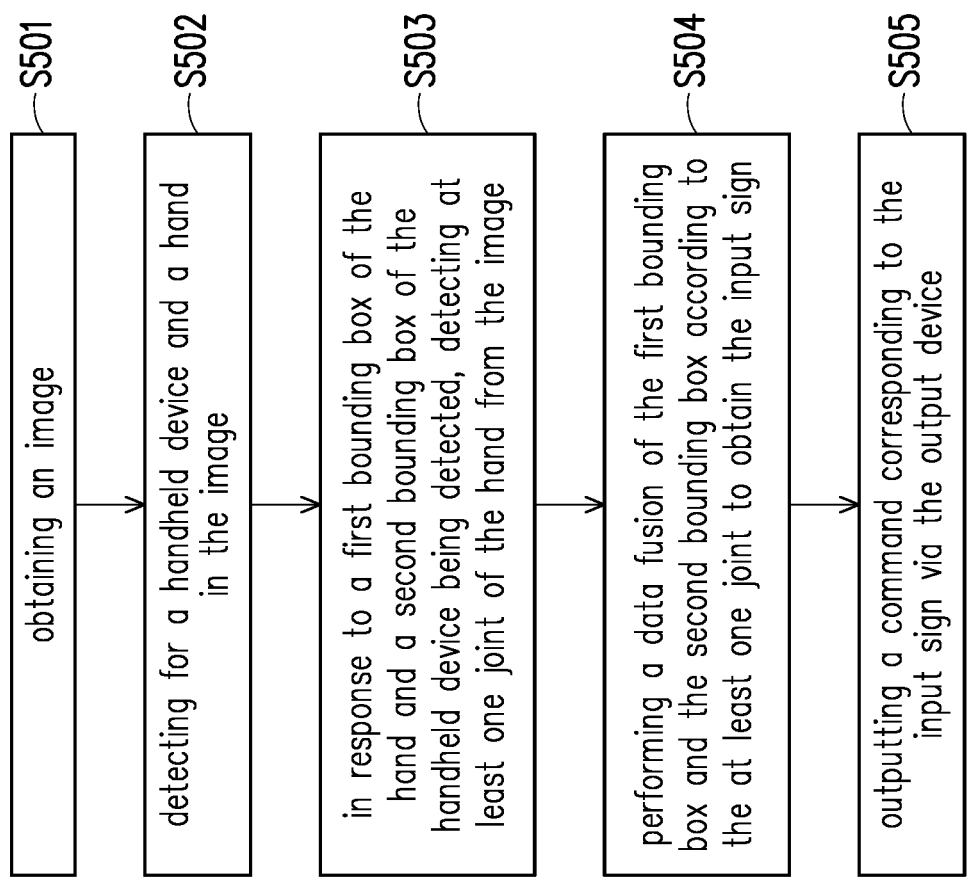
FIG. 5 illustrates a flowchart of a method of tracking an input sign for extended reality according to an embodiment of the present invention.

FIG. 5 illustrates a flowchart of a method of tracking an input sign for extended reality according to an embodiment of the present invention, wherein the method may be implemented by the system 10 as shown in FIG. 1. In step S501, obtaining an image. In step S502, detecting for a handheld device and a hand in the image. In step S503, in response to a first bounding box of the hand and a second bounding box of the handheld device being detected, detecting at least one joint of the hand from the image. In step S504, performing a data fusion of the first bounding box and the second bounding box according to the at least one joint to obtain the input sign. In step S505, outputting a command corresponding to the input sign via the output device.

In summary, the system of the present invention may recognize an input sign presented by a handheld device and a user's gesture according to a data fusion of bounding boxes. The user may interact with the extended reality with less physical effort. The weights for calculating the result of data fusion can be adjusted based on a relative position between the handheld device and the user's hand, such that the most accurate recognition result of the input sign can be obtained. The input sign may also be associated with data generated by an inertial measurement unit of the handheld device. Based on the above description, the disclosure provides a convenience way for the user to interact with the extended reality.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A system of tracking an input sign for extended reality, comprising:
   an output device;
   an image capture device; and
   a processor, coupled to the output device and the image capture device, wherein the processor comprises:
   a first circuit, obtains an image through the image capture device;

a second circuit, detects for a handheld device and a hand in the image;

a third circuit, in response to both a first bounding box of the hand and a second bounding box of the handheld device being detected and the first bounding box being overlapped with the second bounding box, the third circuit detects at least one joint of the hand from the image;

a fourth circuit, receives a signal corresponding to a user input received by a touch screen of the handheld device, in response to a number of joints of the at least one joint being greater than a threshold, performs a data fusion of the first bounding box, the second bounding box, and the signal according to a first weight of the first bounding box to obtain the input sign, wherein the input sign is presented by at least one of the hand and the handheld device; and a fifth circuit, outputs a command corresponding to the input sign via the output device.

2. The system of claim 1, wherein the fourth circuit is further configured to:

in response to the number of joints of the at least one joint being less than or equal to the threshold, perform the data fusion according to a second weight of the first bounding box, wherein the second weight is less than the first weight.

3. The system of claim 1, wherein the fourth circuit is further configured to:

in response to the second bounding box being detected but the first bounding box not being detected, obtain the input sign according to the second bounding box; and in response to the first bounding box being detected but the second bounding box not being detected, obtain the input sign according to the first bounding box.

4. The system of claim 1, further comprising:

the handheld device, comprising the touch screen.

5. The system of claim 4, wherein the second circuit is further configured to:

detect the handheld device according to a positioning mark displayed by the touch screen.

6. The system of claim 1, wherein the handheld device further comprising:

an inertial measurement unit, wherein the signal corresponds to data generated by the inertial measurement unit.

7. The system of claim 1, wherein the output device comprises a display, wherein the display outputs an extended reality scene according to the command.

8. The system of claim 1, wherein the output device comprises a transceiver communicatively connected to the handheld device, wherein the fifth circuit is further configured to:

output the command to the handheld device via the transceiver.

9. A method of tracking an input sign for extended reality, comprising:

obtaining an image;

detecting for a handheld device and a hand in the image;

in response to both a first bounding box of the hand and a second bounding box of the handheld device being detected and the first bounding box being overlapped with the second bounding box, detecting at least one joint of the hand from the image;

receiving a signal corresponding to a user input received by a touch screen of the handheld device;

in response to a number of joints of the at least one joint being greater than a threshold, performing a data fusion of the first bounding box, the second bounding box, and the signal according to a first weight of the first bounding box to obtain the input sign, wherein the input sign is presented by at least one of the hand and the handheld device; and outputting a command corresponding to the input sign via an output device.

* * * * *